United States Patent Office
3,235,461
Patented Feb. 15, 1966

3,235,461
ESTERS OF 3,5-DIIODO-4-PYRIDONE-N-ACETIC ACID
Ernst Habicht and Ruggero Zubiani, Schaffhausen, Switzerland, assignors to Cilag-Chemie Limited, Schaffhausen, Switzerland, a Swiss company
No Drawing. Filed Apr. 8, 1963, Ser. No. 271,460
Claims priority, application Switzerland, Apr. 19, 1962, 4,820/62; Feb. 1, 1963, 1,271/63
4 Claims. (Cl. 167—95)

The present invention relates to new esters and their use. More particularly the present invention relates to new esters of the general formula

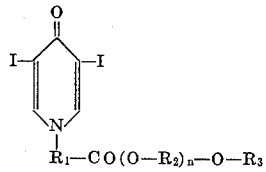
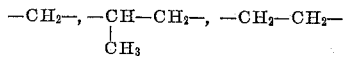 (I)

wherein $R_1$ represents one of the radicals $$-CH_2-, -CH-CH_2-, -CH_2-CH_2-$$
$$\phantom{-CH_2-,\ -}|$$
$$\phantom{-CH_2-,\ -}CH_3$$

$R_2$ means an ethylene or isopropylene radical, and $n$ stands for the figures 2 to 6 inclusive and $R_3$ for methyl, ethyl, propyl or isopropyl.

The new esters of Formula I are valuable X-ray contrast agents. They are preferably used for the visualization of body-cavities, for instance for bronchographical purposes, particularly for the lymphography.

The new esters of the general Formula I have very interesting physical properties, which render possible their application as X-ray contrast agents. Those esters of the Formula I, in which $n$ means the figures 2, 3 and 4

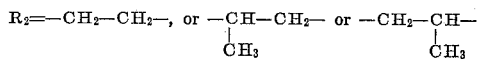

are little or practically not soluble in water. They can be applied in form of suspensions. For the stabilization of the suspension, compatible dispersing agents as for instance Tween-80, etc., can be added.

Those esters of the Formula I, wherein $R_1$ stands for methylene, $R_2$ for ethylene, $R_3$ for methyl and $n$ for the integers 5 and 6, represent crystalline substances with low melting point and good solubility in water.

The new esters of the Formula I can be prepared by reacting a compound of the formula

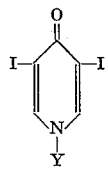
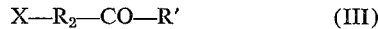 (II)

with a compound of the formula $$X—R_2—CO—R'$$ (III)

in which formulae Y and X mean easily splittable radicals and R' corresponds to the group $$—(O—R_2)_n—O—R_3$$

or represents a radical which can easily be transferred into this group; in the latter case in the obtained product of the formula

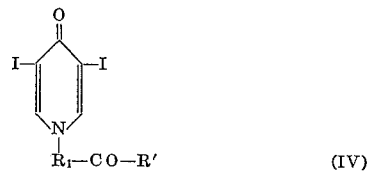
$R_1—CO—R'$ (IV)

transforming the said radical R' into the group $$—(O—R_2)_n—O—R_3$$

According to the process it is for instance possible to proceed in such a manner as to react an alkali salt or a heavy metal salt of 3,5-diiodopyridone (Formula II, Y=Me) with a compound of the formula $$Hal—R_1—CO(O—R_2)_n—O—R_3$$ (V)

(Formula II, X=halogeno, $R'=(O—R_2)_n—O—R_3$).

It is likewise possible to prepare the new esters by preparing a 1-carboxyalkyl-3,5-diiodopyridone or a 1-carbalkoxyalkyl-3,5-diiodopyridone respectively (Formula IV, R=—COOH, —COOalkyl respectively) and reacting a thus formed derivative with an alcohol of the formula $$H(O—R_2)_n—O—R_3$$ (VI)

In the first case, i.e., when a 1-carboxyalkyl-3,5-diiodopyridone is prepared, which should then be reacted with an alcohol of the Formula VI, preference is given to a dehydrating agent as means, such as for instance a carbodiimide, for example dicyclohexylcarbodiimide. Of course, also a mixed anhydride of a 1-carboxyalkyl-3,5-di-iodopyridone, for instance such a one with a carbonic acid half ester, can be reacted with an alcohol of the Formula VI. A further possibility is to prepare an ester of an 1-carboxyalkyl-3,5-diiodopyridone, for example an alkyl or aryl ester and to react the latter with an alcohol of the Formula VI, following the methods commonly used for transesterifications.

It is likewise possible to prepare the 1-carboxyalkyl- or carbalkoxyalkyl-3,5-diiodo-4-pyridones by reaction of a salt of the 3,5-diiodopyridone with a corresponding halogenide, for instance with a halogenoacetic acid, a halogenoacetic acid alkyl ester, a halogenopropionic acid ester, etc.

In the following examples, the polyalkylene glycols are for simplicity's sake numbered continuously as carbon-chains, i.e.

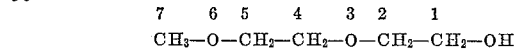

3,6-dioxa-heptanol-(1).

EXAMPLE 1

(a) [3,6-dioxaheptyl-(1)]-chloroacetate

To a solution of 67.8 g. of chloroacetylchloride in 500 cc. of absolute ether there is added under stirring and external cooling by drops a solution of 72 g. of diethyleneglycol-mono-methylether and 78 g. of ethyl-diisopropylamine in 150 cc. of ether. Subsequently, there is diluted with 350 cc. of absolute ether and the whole is left standing over night. This is followed by shaking at first twice with 50 cc. each of 2 N HCl, then twice with 2 N $Na_2CO_3$ solution and eventually once with water. The ethereal solution is dried over sodium carbonate and then evaporated. There are thus obtained 30 g. of the title substance, boiling under 0.005 mm. Hg at 68–69° C. The new ester is readily soluble in water and very readily soluble in ether.

(b) [3',6'dioxaheptyl-(1')]-3,5-diiodo-4-pyridone-N-acetate 49.6 g. of 3,5-diiodo-4-pyridone-N-sodium salt are suspended in 150 cc. of absolute dioxane. 26.4 g. of the chloroacetate obtained according to (a) are added under stirring to this suspension at a temperature of 25° C. The whole is now boiled under stirring for three hours, then cooled and the insoluble particles are filtrated by suction. After washing with dioxane the filtrate is evaporated. The residue (53 g.) carystallizes after a certain time. The crystal mass is further triturated with 300 cc. of absolute ether and then filtered by suction. After recrystallization from methanol there are obtained 33.8 g. of the title substance in colorless crystals which melt at 129–130° C.

The new ester is readily soluble in hot ethanol, acetone and chloroform, moderately soluble in hot ethylacetate and little soluble in cold ethanol, acetone, chloroform and hot water. The new ester does practically not dissolve in hot benzene and ether. The new ester is likewise only little soluble in 10% aqueous triethyleneglycol solution, but is moderately soluble in 40–50% aqueous triethyleneglycol solution.

EXAMPLE 2

(a) 3,6,9-trioxa-decanol-(1)

To 197 g. of triethyleneglycol are added 10 g. of thinly cut sodium. The whole is slowly heated to 80–85° C., whereby the sodium dissolves. Then 63.5 g. of methyliodide are added by drops at 50–60° C. and the whole is stirred for 7 hours at 60–70° C. Subsequently, the whole is distilled in the vacuum, whereby the fraction boiling under 13 mm. Hg at 125–130° C. is collected (45 g.). This fraction represents the wanted product.

(b) [3,6,9-trioxa-decyl-(1)]-chloroacetate 44.9 g. of the alcohol obtained according to (a) and 35.3 g. of ethyl-diisopropylamine are reacted with 30.9 g. of chloroacetylchloride following the prescription in Example 1a. There are obtained 20 g. of the title substance, which boils under 12 mm. Hg at 170–175° C.

(c) [3',6',9'-trioxa-decyl-(1')]-3,5-diiodo-4-pyridone-N-acetate 29 g. of 3,5-diiodopyridone-N-sodium salt are suspended while stirring in dioxane. To this suspension are added 18.8 g. of the chloroacetate obtained according to (b). The whole is now heated to reflux for 6 hours, while thoroughly stirring. Subsequent cooling is followed by filtrating the insoluble particles by suction. The filtrate is filtered with charcoal and evaporated to dryness. The residue represents a yellow honey mass, which solidifies after a short time. The crystals are triturated with ether and then recrystallized from ethanol. There are thus obtained 17.2 g. of the title substance melting at 97–98° C. This is readily soluble in cold acetone and chloroform, hot ethanol, ethylacetate and benzene. The solubility in hot water is moderate; the compound dissolves moderately in 10% aqueous triethyleneglycol solution, satisfactorily in 20% aqueous triethyleneglycol solution, easily in 40% aqueous triethyleneglycol solution and very easily in 50% aqueous triethyleneglycol solution.

EXAMPLE 3

(a) 3,6,9,12-tetraoxa-tridecanol-(1)

62 g. of diethyleneglycol are treated in portions with 4.45 g. of sodium at about 80° C. The whole is heated to approximately 120° C. until the sodium is completely dissolved. Then there are added while stirring at about 60° C. 53 g. of 3,6-dioxa-heptanol-(1)-p-tosylate [this latter prepared by reacting p-toluenesulfochloride with 3,6-dioxa-heptanol-(1) in CHCl₃ with triethylamine as auxiliary base at 0–5° C.; the ester is not especially purified, after filtration of triethylamine·HCl and evaporation of the chloroform, it is further used in its raw form]. The whole is now heated to 75° C., by and by a crystalline sediment results. Two hours' stirring at 75° C. is followed by cooling down. Then the whole is treated with 100 cc. of acetone and 1 lt. of ether, the insoluble sodium salt of the p-toluene sulfonic acid is filtered by suction. The filtrate is evaporated to dryness and the residue is distilled in the vacuum. The fraction which boils under 11 mm. Hg at 163–166° C. is collected, it represents the titled substance (yield 14 g.). A further reaction with the double quantity gave a yield of 39 g.

(b) 3,6,9,12-tetraoxa-tridecyl-(1)-chloroacetate 39.3 g. of the alcohol obtained according to (a), 24.4 g. of ethyldiisopropylamine and 21.4 g. of chloroacetic acid chloride are reacted and worked up in accordance with the prescriptions of Example 1a. The fraction boiling under 0.005 mm. Hg at 115–120° C. is separated and represents the title substance.

(c) [3',6',9',12'-tetraoxa-tridecyl-(1')]-3,5-diiodo-4-pyridone-N-acetate 16.3 g. of 3,5-diiodo-4-pyridone-N-sodium salt are suspended in 100 cc. of absolute dioxane. To this suspension are added 12.6 g. of the ester obtained according to (b). The whole is heated for 3 hours to reflux. After cooling, the insoluble particles are filtered by suction and washed with dioxane. The filtrate is filtered with charcoal and evaporated to dryness. The residue represents a brown honey mass which crystallizes when triturated with ether. After recrystallization from ethanol, there are obtained 16 g. of the title substance melting at 73–74° C. This latter is very readily soluble in cold acetone, chloroform and hot ethanol, ethylacetate and benzene. This substance is moderately soluble in hot water, and little in cold ethylacetate and benzene. The substance dissolves moderately in 10% aqueous triethyleneglycol solution, dissolves fairly in 20% aqueous triethyleneglycol solution, easily in 30–40% aqueous triethyleneglycol solution and dissolves very easily in 50% aqueous triethyleneglycol solution.

EXAMPLE 4

(a) 3,6,9,12,15-pentaoxa-hexadecanol-(1)

93.5 g. of diethyleneglycol, 6.9 g. of sodium and 93.5 g. of 3,6,9,12 - tetraoxa-tridecanol-(1)-p-tosylate [prepared from the corresponding alcohol and toluene sulfonic acid chloride in CHCl₃ solution in the presence of triethylamine] are reacted in the manner described in Example 3a. The fraction boiling under 0.005 mm. Hg at 130–133° C. is separated and represents the title substance.

The 3,6,9,12,15-pentaoxa-hexadecanol-(1) can also be prepared in the following manner. 28 cc. of thionylchloride are placed in a stirring flask and 54.8 g. of triethyleneglycol-mono-methylether (offered by Fluka, Switzerland), are added dropwise under stirring and cooling. The whole is stirred for 2½ hours at room temperature and then heated for 3 hours to approximately 100° C. After cooling, the solution is left to stand for 24 hours at room temperature and then poured on ice. The formed 1-chloro-3,6,9-trioxadecane is extracted with chloroform, the chloroform layer washed with sodium bicarbonate solution and dried over K₂CO₃. After evaporating of the chloroform, the whole is distilled, thereby collecting separately the fraction which boils under 10 mm. at 105–108° C. There are obtained 29 g. of 1-chloro-3,6,9-trioxadecane, corresponding to 48% of the theoretical value.

53.2 g. of diethyleneglycol are heated to 150° C. in the oil-bath under nitrogen atmosphere. Then 5.75 g. of sodium wire are added to the diethyleneglycol and further heated until the sodium is totally dissolved. Subsequently the whole is cooled to 80° C. and 48 g. of 1-chloro-3,6,9-trioxadecane are added. After a short time the formed sodium chloride starts to precipitate as thick crystalline slurry. The whole is further heated to 100° C. and left for 7 hours at this temperature. After having been left to stand over night the mass is treated with 100 cc. of ether and 100 cc. of acetone. The sodium chloride is filtered off by suction and the filtrate evaporated in the vacuum. The residue is taken up in chloroform, the chloroform layer washed with diluted hydrochloric acid and water and then dried over $K_2CO_3$. After evaporating of the chloroform, the whole is distilled in the vacuum, thereby collecting separately the fraction which boils under 0.01 mm. at 143° C. The yield weighs 55.75 g. corresponding to 50.1% of the theoretical value.

In the same manner there can be prepared the 3,6,9,12, 15 - pentaoxa-1,4,7,10,13-pentamethyl-hexadecanol - (1) [B.P. 0.004 mm.: 132–136° C.].

(b) [3,6,9,12,15-pentaoxa-hexadecanol-(1)]-chloroacetate 19.7 g. of the alcohol obtained according to (a) are dissolved in 50 cc. of absolute ether and treated while stirring at 20° C. with 9.7 g. of chloroacetic acid chloride. The light HCl escape is finished after about 30 minutes. Then the whole is left standing for 24 hours at room temperature, then the ether is distilled off. The residue is fractionated in the high vacuum. There are obtained 23.9 g. of the wanted ester, corresponding to 93.5% of the theoretical value, which boils under 0.01 mm. Hg at 140–143° C.

In the same manner there can be prepared the 3,6,9,12, 15 - pentaoxa-1,4,7,10,13-pentamethyl-hexadecanol - (1)-chloroacetate (B.P. 0.005 mm.: 142–145° C.).

(c) [3',6',9',12',15'-pentaoxa-hexadecyl-(1')-3,5-diiodo-4-pyridone-N-acetate 26.8 g. of diiodopyridone-N-sodium salt are suspended in 200 cc. of absolute dioxane. To this suspension, 23.9 g. of the ester obtained according to (b) are added. Further proceeding and working up is carried out as indicated in the foregoing examples. The residue, a yellow honey mass, is triturated with ether. This process is repeated several times, the honey mass thereby changing into a solid substance melting at 42° C. This substance represents the title substance. The new iodo compound is readily soluble in water, ethanol, ethylacetate, acetone and dioxane, and is little soluble in ether, petroleum ether, dipropylether and tetrachloromethane. The title substance can also be prepared as follows:

18.45 g. of 3,5-diiodo-4-pyridine sodium are stirred with 47 cc. of tetrahydrofurane (anhydrous) to a fine slurry in a mechanical agitator. Susequently there are added to this slurry by drops 16.44 g. of the chloroacetic acid ester, obtained according to (b). The temperature slightly rises from 27 to 29° C. After the addition of the chloroacetic acid ester, the whole is heated to boiling for 5 hours while vigorously stirring. Then the whole is left to stand for 24 hours. The formed sodiumchloride is filtered off by suction, washed with tetrahydrofurane and discarded. The combined filtrates are shaken with 1 g. of dry carboraffin-C, then filtered and the filtrate evaporated on the water bath at a maximum temperature of 40° C. in the vacuum. The oily residue is shaken for some time with 70 cc. of ether (anhydrous). After 3 hours the whole has set to a crystalline slurry. This slurry is again triturated with 100 cc. of absolute ether, then filtered by suction and dried in the vacuum drying oven at 30° C. There are obtained 25.5 g. of the title substance, melting at 42° C. The yield corresponds to 80% of the theoretical value.

In the same manner there can be prepared the [3',6',9',12',15' - pentaoxa - 1',4',7',10',13' - pentamethyl-hexadecyl-(1')]-3,5-diiodo-4-pyridone-N-acetate.

EXAMPLES FOR COMPOSITIONS CONTAINING ESTERS OF THIS INVENTION

I. 36 g. of chemically pure glucose are dissolved in 720 g. of freshly distilled water and the obtained solution is filtered. To the filtrate are now added while thoroughly turbinating 4 g. of pure sodium carboxymethyl cellulose (medium viscosity); this sodium carboxymethyl cellulose being moistened with 10 g. of twice distilled benzylalcohol before adding to the filtrate. The obtained clear solution is filtered through a glass filter (frit $G_1$ or $G_2$), filled into sealed containers and sterilized at high temperatures. After cooling there are added to the sterilized solution 2 g. of Tween-20 and 500 g. of microcrystalline contrast substance of the formula

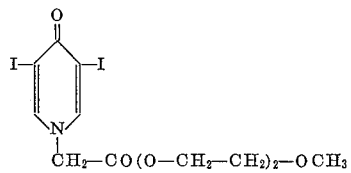

In order to evenly distribute the contrast substance, the whole is treated with an ultra vibrator. There is thus obtained a 50 percent by volume contrast suspension, which is ready for use in bronchography. Should the solution be used for salpingography, the amount of thickener be reduced to half the quantity.

II. 700 g. of contrast substance of the formula

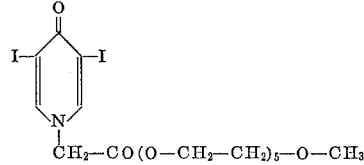

are dissolved in 700 g. of distilled and sterilized water, the whole is filtered through a bacteria filter. There results a 100% clear solution, which is suitable for lymphography. This solution can, if necessary, be diluted with sterile water to a content of 75 or 50%.

Amongst the compounds embraced by formula

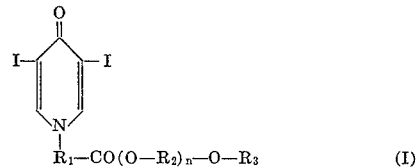

the 3,5-diiodo-4-pyridone-N-acetic ester of pentaethylene glycol monomethylether draws the attention because of its remarkable physical properties. This ester is particularly suitable for the visualization of certain body cavities, especially in lymphography.

Lymphography plays an outstanding part today because of its importance in diagnosing metastases of cancer.

It is known that for the visualization of lymphatic vessels, and in particular of abdominal lymph nodes, water-insoluble iodized oils are used as well as water-soluble contrast media. As there is no access to the lymph nodes from outside, one has to rely on introducing the contrast medium via a peripheral lymphatic vessel, usually a dorsal lymphatic vessel of the foot.

The long passage by which the contrast medium reaches the system of the abdominal lymph nodes, and the addition of lymph collected from the surrounding tissues and from other lymph vessels, result in such a considerable dilution of the aqueous contrast medium that it becomes difficult to ensure sufficient concentration of contrast medium in the system of organs for visualization. It should also be borne in mind that all presently available aqueous radiographic contrast solutions are highly hypertonic. In the blood vessels where the rapid flow ensures dilution, diminution of the hypertonicity, and a brevity of the action on each section of the vessel, the proper choice of salt composition can make inoffensive the lesions of the vascular walls, which may occur, whereas in the lymphatic vessels where flow is slow, lesions of the vascular walls are to be expected, at least in the periphery. Use of oily contrast media entails the danger of granulomas as a result of irritation, because they generally contain iodine in an aliphatic bond, therefore not as closely linked as it in the modern radiographic contrast media. In any case, oily drops remain in the respective organs, where they are hardly resorbed or at least very slowly. Apart from this, experience in bronchograph as well as the surface tension properties of oils exclude the possibilty of a good visualization of surfaces. On the basis of these statements and considerations, the requirements for a lymphographic contrast medium can be resumed as follows:

(1) For technical purposes it should contain an isolable crystalline substance.

(2) It must be injectable in aqueous solution.

(3) On its passage from the periphery to the abdominal lymph node it should not undergo too rapidly dilution by inflowing lymph.

(4) It should have very little osmotic pressure and therefore should not be in the form of a salt if possible. It should be on the whole well tolerated and non-irritant.

(5) In order to avoid formation of badly resorbable residues, it should not contain any thickener such as carboxymethyl cellulose. It should be resorbable or excretable in form of molecules or in fractions with a known toxicology.

(6) It should contain strongly bound (aromatic) iodine.

It has now been found that the particular ester of the formula

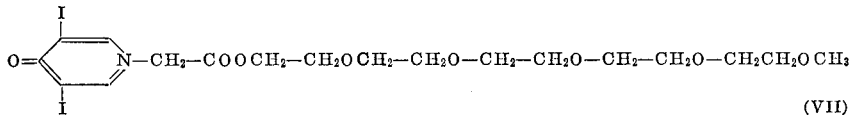

(VII)

possesses all these properties, which are in great part contradictory. 3,5-diiodo-4-pyridone-N - acetic ester of pentaethylene glycol monomethylether has a molecular weight of 637.24, an iodine content of 39.7%, and a melting point of 42° C.

The esters of Formula I in which $n=1-4$ are practically insoluble in water and their melting points are comparatively high. Surprisingly, the aspect changes suddenly when $n=5$. The crystalline substance is water-miscible, viz. water-soluble at room temperature in every conceivable proportion. The solution has the very remarkable property that on heating above 38° C. two phases appear and form a milky emulsion. At rest and in the warmth two separate layers form. On cooling, higher concentrations of such emulsions suddenly become clear, while at lower concentrations this process goes through a transient opalescent phase. A quite similar behavior can be observed when water is replaced by an isotonic saline solution, except that in these cases the clearance points lie a few degrees lower. These properties bring about the following behavior:

When using a solution which appears clear and fairly liquid at room temperature, this can be injected smoothly into a lymphatic vessel of the foot. As long as the temperature does not rise above 32° C., no particular behavior is to be expected. However, when the solution passes through regions where the temperature is higher, the above described turbidity appears. Tests have shown that a solution of 2 g. of the ester according to Formula VII in 8 cc. of water separates at 37° C. into two phases, of which the lighter one represents 16.9% of substance and the heavier, oil-like one, 41% of water. When using isotonic saline instead of water, the corresponding numbers are 11.7% and 29%. In the presence of water the oil-like phase is diluted very slowly, and can be expected to possess an affinity for surface structures of organs. Tests on a dog weighing 9 kg. have shown that a 100% solution of 10 g. of the substance injected into a lymphatic vessel of a foot make a perfectly satisfactory visualization of the abdominal lymph nodes possible.

The ester according to Formula VII is slowly saponified at a pH of 4. Saponification is quicker at a pH of 7, and even more so at a pH of 8. This saponification produces diiodo-pyridone-N - acetic acid (A) and pentaethylene glycol monomethylether (B). The toxicology and mode of excretion of both are known.

Fraction (A) has a toxicity ($LD_{50}$) of a approximately 6 g./kg. i.v. in rats. The second fraction (B) shows a toxicity of 10 g./kg. intraperitoneally in rats.

The ester according to Formula VII itself has a $LD_{50}$ of approximately 10 g./kg. intraperitoneally in rats.

It is interesting to note the osmotic conditions of the ester with Formula VII. The substance does not have the character of a salt and therefore is not dissociated. This is already a reason for the primarily expected lowering in freezing point to be only 60% of that expected in solutions of the habitual water-soluble contrast media with an equal iodine content. Whereas in the latter the lowering in freezing point, when measured, corresponds to approximately 15% of the calculated one, and solutions with an iodine content of 200 viz. 40 mg./cc. are 3–6 times hyperosmotic in relation to serum, in the ester according to Formula VII a molecular association takes place, which increases proportionally to the concentration, resulting in a solution with an iodine content of 205 mg./cc. (approximately a 52% aqueous solution) being isoosmotic. When diluting such a solution with a serious body fluid, the surprising observation can be made that inside the body in any phase of dilution by serum, a total maximum osmotic pressure approximately equal to 1.1 times that of serium can be counted on. This corresponds to a maximum lowering in freezing point of 0.65° C. (serum 0.56° C.).

The viscosity of 100% aqueous solutions of the ester according to Formula VII is 123.5 cps. at 20° C. and 46.7 cps. at 37° C. An 81% solution has a viscosity of 42.9 cps. at 20° C. and 21.3 cps. at 37° C. A 50% solution has a viscosity of 8.3 cps. at 20° C. and 3.5 cps. at 37° C.

The properties found in the ester with formula VII indicate that not only lymphatic vessels but other body cavities can be visualized as well, thus allowing for e.g. hysterosalpingographies, bronchographies, arthrographies, and myelographies. In order to make a bronchography it is for instance even possible to spray the solution at room temperature, whereby the solution precipitating on the surface of the organ separates into two phases, the so-called oily one settling on the surface of the organ as a result of its affinity for it. This makes it possible to work without a thickener and without producing any noteworthy reduction of the bronchial lumen.

The above mentioned spray solutions are easy to prepare, e.g. by mixing an aqueous solution of the ester according to Formula VII with an expellant and, if necessary, with a disperser, and putting it into an atomizer.

It is also possible to mix aqueous/alcoholic solutions of the ester of Formula VII with an expellant such as Freon 12, Freon 114, Freon 11, or mixtures of such Freons, and put the product into atomizers. In these cases the addition of a disperser is usually unnecessary, because the alcohol used (ethanol, isopropanol) has sufficient solvent properties.

Thus the present application refers to the use of the ester according to Formula VII as a radiographic contrast medium for the visualization of body cavities.

What we claim is:

1. Esters of the formula

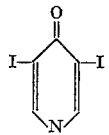
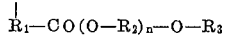

wherein $R_1$ is a radical selected from $$-CH_2-, \quad -CH_2-CH_2-$$

and $$-\underset{\underset{CH_3}{|}}{CH}-CH_2-$$

$R_2$ is a member selected from the group consisting of ethylene and isopropylene, $R_3$ is a radical selected from the group consisting of methyl, ethyl, propyl and isopropyl and $n$ is an integer from 2 to 6 inclusive.

2. Esters of the formula

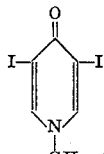
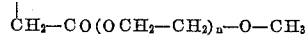

wherein $n$ is an integer selected from 5 and 6.

3. The ester of the formula

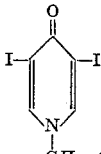
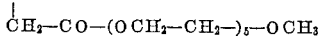

4. X-ray contrast agent for lymphography and bronchography containing the ester of the formula

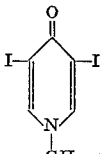
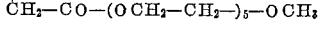

in form of an aqueous solution.

References Cited by the Examiner
UNITED STATES PATENTS

| | | | |
|---|---|---|---|
| 2,064,944 | 12/1936 | Reitmann et al. | 260—295 |
| 2,505,634 | 4/1950 | Archer | 260—295 |
| 2,995,561 | 8/1961 | Habicht | 260—295 |
| 3,021,260 | 2/1962 | Distelmaier et al. | 260—295 |

WALTER A. MODANCE, *Primary Examiner.*

NICHOLAS S. RIZZO, *Examiner.*